United States Patent
Faraj

Patent Number: 6,041,945
Date of Patent: Mar. 28, 2000

[54] GROCERY BAG HOOK FOR A VEHICLE

[76] Inventor: Abdul-Razzak Faraj, P.O. Box 566068, Atlanta, Ga. 31156

[21] Appl. No.: 09/229,195

[22] Filed: Jan. 13, 1999

[51] Int. Cl.$^7$ ..................................................... A47F 5/00
[52] U.S. Cl. .......................... 211/12; 211/12; 211/86.01; 224/925
[58] Field of Search ............................ 211/12, 119.004, 211/119.007, 106.01, 86.01, 85.15; 224/925, 551; 248/214, 215, 188.4

[56] References Cited

U.S. PATENT DOCUMENTS

| | | | |
|---|---|---|---|
| 1,125,668 | 1/1915 | Deming | 248/118.4 |
| 3,131,505 | 5/1964 | Cruikshank | 248/188.4 |
| 5,014,948 | 5/1991 | Asaro et al. | 211/119.004 X |
| 5,287,971 | 2/1994 | Dorman | 211/12 |
| 5,427,288 | 6/1995 | Trubee | 224/925 |
| 5,819,996 | 10/1998 | Koons | 224/925 X |

*Primary Examiner*—Robert W. Gibson, Jr.
*Attorney, Agent, or Firm*—John L. James

[57] ABSTRACT

A grocery bag hook has an adjustable frame for mounting in the trunk or cargo compartment of a vehicle. The frame can be left in the trunk while a bracket with hooks for holding the grocery bags is removed for storage or attached to a seat or other portion of the vehicle using mounting straps attached to the bracket. A thumbscrew adjusts the height of the frame so that it fits snugly between the floor of the trunk and one of the top panels of the trunk.

12 Claims, 1 Drawing Sheet

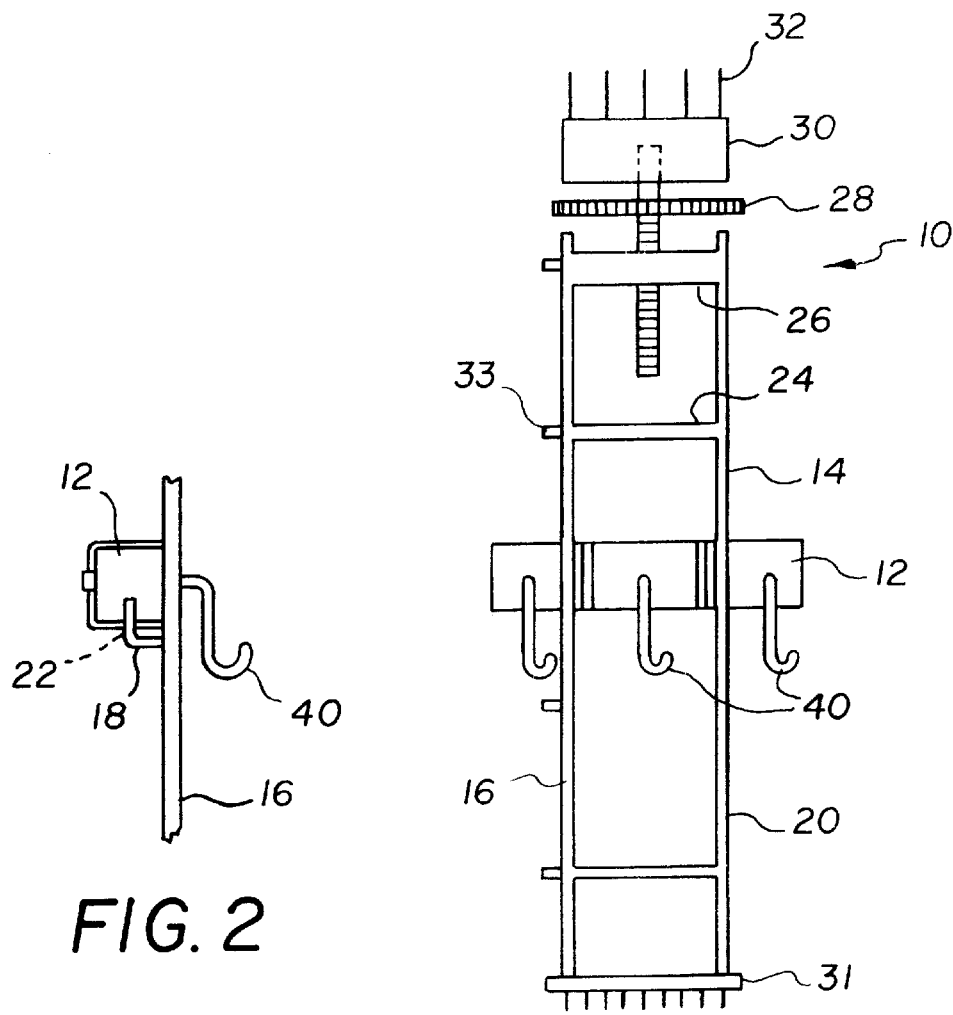
FIG. 2
FIG. 1
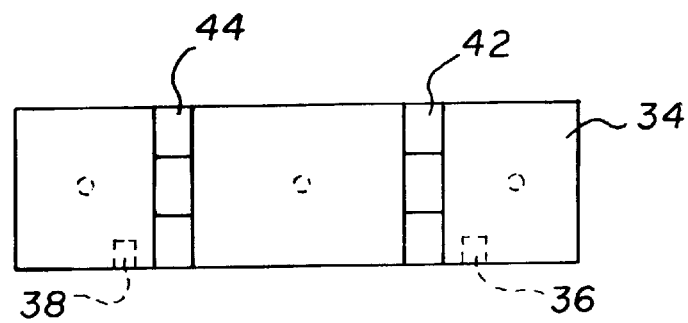
FIG. 3

6,041,945

GROCERY BAG HOOK FOR A VEHICLE

FIELD OF THE INVENTION

The present invention relates to a device for holding a grocery bag to keep the contents from spilling when the bag is transported in a vehicle.

BACKGROUND OF THE INVENTION

When transporting bags of groceries or other items in a vehicle, it is desirable to carry them in the trunk. To prevent bags from tipping, many people place the bags in a cardboard or plastic box that is carried in the trunk. Naturally, the box occupies precious trunk space when it is not in use for grocery bags. Some vehicles have a net or straps attached to the sidewall of the trunk to restrain grocery bags to prevent damage during vehicle operation. The net or straps are detachably connected for storage when not in use thereby freeing trunk space. Because the net extends all the way across the trunk and is detachably connected, it has a certain amount of elasticity. Unfortunately, the elasticity allows grocery bags or their contents to tip over or spill. Accordingly, it will be appreciated that it would be highly desirable to have a device for holding grocery bags upright in the trunk of a vehicle that does not waste trunk space when bags are not present.

SUMMARY OF THE INVENTION

Briefly summarized, according to one aspect of the present invention, an apparatus for holding a grocery bag upright in a vehicle comprises an elongated member having an interior bounded by a front face, a rear face, a top edge and a bottom edge. A hook is attached to the front face for engaging handles of a grocery bag and supporting the grocery bag. A mounting strap is attached to the elongated member for mounting the elongated member.

The elongated member is mounted in the trunk of a vehicle using an adjustable frame. The frame has protruding flanges to engage openings in the elongated member containing the hooks. A thumbscrew adjusts the height of the frame so that is stands upright in the trunk and is wedged between the floor of the trunk and a horizontally oriented panel along a side of the trunk. The frame stays in place once mounted and is unobtrusive, but the elongated member can be removed. By making the elongated member square or rectangular, bags can be hung on several sides to accommodate more bags.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic front view of a preferred embodiment of a grocery bag hook and frame for a vehicle according to the present invention.

FIG. 2 is a partial left side view of the grocery bag hook and frame of FIG. 1.

FIG. 3 is a rear view of the grocery bag hook and frame of FIG. 1.

DETAILED DESCRIPTION OF THE PREFERRED EMBODIMENTS

Referring to FIGS. 1–3, a device 10 for holding grocery bags upright in a vehicle has a hook assembly 12 and a frame assembly 14. The frame assembly 14 includes a first upright member 16 that has a protruding mounting flange 18. Mounting flange 18 is preferably an elongated cylinder bent at an angle so that an upstanding portion of it is spaced from the first upright member, but it can be a flat members as well. Mounting flange 18 preferably protrudes from the rear of upright member 16 but can protrude from the front if desired. A second upright member 20 is spaced from the first upright member 16 and has a protruding mounting flange 22 similar to mounting flange 18. Two uprights are shown, but there could be more than two. Also, they could be arranged in a triangular or rectangular pattern but a linear arrangement is preferable for conserving space.

A plurality of cross members 24 connect the upright members 16, 20. With the cross members 24 attached, the width of the frame may be a couple of inches or may be larger on the order of a foot or more. A width of only a couple of inches is preferred to conserve spaced when grocery bags are not being transported.

One cross member 26 has a threaded opening for receiving a threaded portion of the shaft of a thumb screw 28. A nonthreaded portion of the shaft engages an opening in an top end cap 30 and rotates relative to top end cap 30. As the thumb screw 28 is turned, the distance between the top end cap 30 and cross member 26 changes to adjust the height of the frame so that it fits snugly against the floor and upper panel of the trunk. A comb or fingers 32 on the top end cap 30 ensure nonslip engagement of the top end cap with trunk surfaces. As illustrated, the top end cap 30 is on the upper end of the frame but may be positioned on the lower end. In addition, the upright members of the frame may be adjustable to fits trunks of different dimensions.

Where it is desired to mount the device 10 horizontally instead of vertically, a bottom end cap 31 can be used. Bottom end cap 31 is mounted on the bottom ends of upright members 16, 20, and has a comb or protruding fingers similar to those of top end cap 30. An additional thumbscrew (not shown) can be used with the bottom end cap if desired. A plurality of fingers or hooks 33 extend from left upright member 16 in a direction away from right upright member 20. Hooks or fingers 33 may be extensions of the cross members 24, 26, integrally formed on left upright member 16 or attached to left upright member 16. When mounted horizontally, in a corner of a vehicle trunk against vertical panels, for example, the hooks or fingers 33 extend vertically upward from now horizontal left upright member 16 to engage handles of grocery bags. The hook assembly 12 can be removed because it is not needed when the device 10 is mounted horizontally.

The hook assembly 12 includes an elongated member 34. Grocery bags are held on the elongated member 34 which has an interior bounded by a front face, a rear face, a top edge and a bottom edge. The elongated member 34 has first and second mounting openings 36, 38 extending from the bottom edge into the interior for receiving the protruding mounting flanges 18, 20 respectively. Elongated member 34 has a plurality of hooks 40 attached to the front face for engaging handles of a grocery bag and supporting the grocery bag. Elongated member 34 is preferably constructed of wood with hooks 40 screwed into it.

First and second mounting straps 42, 44 are attached to elongated member 34 for attaching the elongated member to a vehicle seat or other structure in the vehicle. Straps 42, 44 may be constructed of woven nylon as is known in the art for belts and straps, and fitted with a buckle that permits varying the length of the straps. Straps 42, 44 may be fastened to elongated member 34 with an adhesive or with tacks or other fasteners.

While the invention has been described with particular reference to the preferred embodiments, it will be understood by those skilled in the art that various changes may be made and equivalents may be substituted for elements of the preferred embodiments without departing from invention. For example, while the frame has been described with a thumb screw, jacks or other adjusting devices could be used.

As is evident from the foregoing description, certain aspects of the invention are not limited to the particular details of the examples illustrated, and it is therefore contemplated that other modifications and applications will occur to those skilled in the art. For example, clips may be used instead of hooks or in addition to hooks. It is accordingly intended that the claims shall cover all such modifications and applications as do not depart from the true spirit and scope of the invention.

What is claimed is:

1. An apparatus, comprising:

an elongated member having an interior bounded by a front face, a rear face, a top edge and a bottom edge, said elongated member having a mounting opening extending from said bottom edge into said interior;

a hook attached to said front face for engaging handles of a grocery bag and supporting the grocery bag;

a frame having an upright member with a mounting flange for engaging said mounting opening of said elongated member to mount said elongated member on said frame;

a cap; and a thumbscrew connecting one end of said upright member and said cap to vary the distance between said upright member and said cap to thereby fix said frame in a position between two horizontally oriented surfaces.

2. An apparatus, as set forth in claim 1, wherein said cap has a plurality of fingers for gripping one of said horizontally oriented surfaces.

3. An apparatus, comprising:

a first upright member having a protruding mounting flange;

a second upright member having a protruding mounting flange;

a plurality of cross members connecting said first and second upright members;

a top end cap;

a thumbscrew connecting said top end cap and one of said cross members to vary the distance between said one cross member and said cap to thereby fix said first and second uprights in a position between two horizontally oriented surfaces;

an elongated member having an interior bounded by a front face, a rear face, a top edge and a bottom edge, said elongated member having first and second mounting openings extending from said bottom edge into said interior for receiving said protruding mounting flanges; and a hook attached to said front face of said elongated member for engaging handles of a grocery bag and supporting the grocery bag.

4. An apparatus, as set forth in claim 3, wherein said top end cap has a plurality of fingers for gripping one of said horizontally oriented surfaces.

5. An apparatus, as set forth in claim 3, including first and second mounting straps attached to elongated member.

6. An apparatus, as set forth in claim 3, including a bottom end cap attached to a bottom portion of said first and second upright members.

7. An apparatus, as set forth in claim 6, wherein said bottom end cap has a plurality of fingers for gripping one of said horizontally oriented surfaces.

8. An apparatus, as set forth in claim 3, including a plurality of fingers extending from said first upright member in a direction opposite said second upright member to thereby engage a handle of a grocery bag and support the grocery bag.

9. An apparatus, comprising:

an elongated member having an interior bounded by a front face, a rear face, a top edge and a bottom edge, said elongated member having a mounting opening extending from said bottom edge into said interior;

a hook attached to said front face for engaging handles of a grocery bag and supporting the grocery bag; and a mounting strap attached to one of said front face, rear face, top edge and bottom edge for mounting said elongated member.

10. An apparatus, as set forth in claim 9, including:

a frame having an upright member with a mounting flange for engaging said mounting opening of said elongated member to mount said elongated member on said frame.

11. An apparatus, as set forth in claim 10, including:

a cap; and a thumbscrew connecting one end of said upright member and said cap to vary the distance between said upright member and said cap to thereby fix said frame in a position between two horizontally oriented surfaces.

12. An apparatus, as set forth in claim 11, wherein said cap has a plurality of fingers for gripping one of said horizontally oriented surfaces.

* * * * *